United States Patent [19]

Hucks et al.

[11] Patent Number: 5,508,375
[45] Date of Patent: Apr. 16, 1996

[54] PROCESS FOR THE PREPARATION OF POLYCARBONATES

[75] Inventors: Uwe Hucks, Alpen; Jürgen Kadelka, Krefeld; Wolfgang Herrig, Bergisch Gladbach, all of Germany

[73] Assignee: Bayer Aktiengesellschaft, Leverkusen, Germany

[21] Appl. No.: 376,158

[22] Filed: Jan. 20, 1995

Related U.S. Application Data

[63] Continuation-in-part of Ser. No. 159,896, Dec. 1, 1993, abandoned.

[30] Foreign Application Priority Data

Dec. 10, 1992 [DE] Germany .......................... 42 41 619.1

[51] Int. Cl.⁶ .................................................. C08G 64/00
[52] U.S. Cl. ............................. 528/199; 526/64; 526/65; 526/66; 526/71; 526/67; 528/171; 528/191
[58] Field of Search ...................................... 528/199, 190, 528/171, 191; 526/64, 65, 66, 71, 67

[56] References Cited

U.S. PATENT DOCUMENTS

| 3,674,740 | 7/1972 | Vernaleken et al. |
| 3,787,359 | 1/1974 | Horn et al. |
| 3,945,969 | 3/1976 | Horn et al. |
| 4,025,489 | 5/1977 | Bailey et al. |
| 4,122,112 | 10/1978 | Koda et al. |
| 4,737,573 | 4/1988 | Silva et al. ............................... 528/371 |
| 4,847,352 | 7/1989 | Weston et al. ........................... 528/196 |
| 4,959,456 | 9/1990 | Ashida et al. ........................... 528/371 |
| 5,037,941 | 8/1991 | Weston et al. ........................... 529/196 |
| 5,037,942 | 8/1991 | Hunt et al. ............................... 528/198 |
| 5,047,497 | 9/1991 | Tamura et al. ........................... 528/199 |
| 5,210,172 | 5/1993 | van Hout et al. ....................... 528/196 |

FOREIGN PATENT DOCUMENTS

| 306838 | 3/1989 | European Pat. Off. |
| 304691 | 3/1989 | European Pat. Off. |
| 1409614 | 10/1975 | United Kingdom. |

*Primary Examiner*—James J. Seidleck
*Assistant Examiner*—Terressa Mosley
*Attorney, Agent, or Firm*—Joseph C. Gil; Aron Preis

[57] ABSTRACT

The present invention relates to a process for the preparation of polycarbonates in which an oil-in-water emulsion is maintained throughout by employing special reaction conditions.

9 Claims, No Drawings

PROCESS FOR THE PREPARATION OF POLYCARBONATES

This is a continuation-in-part application of U.S. patent application Ser. No. 08/159,896, filed Dec. 1, 1993, now abandoned.

BACKGROUND OF THE INVENTION

The present invention relates to a process for the preparation of thermoplastic, aromatic polycarbonates by the method of phase interface condensation from phosgene, diphenols, chain terminators and optionally branching agents by phosgenating an aqueous alkali metal salt solution of the diphenols at pH values from 8 to 14 in the presence of solvents or solvent mixtures which dissolve aromatic oligocarbonates and aromatic polycarbonates and are not themselves miscible with water, using polycondensation catalysts and three reactors arranged in series, characterized in that a proportion of the aqueous reaction phase obtained after completion of the reaction is returned to the phosgenating reactor together with the raw materials in such a quantity that an oil-in-water emulsion is formed directly and is maintained in the three reactors over the whole reaction time.

In the preparation of polycarbonates by the phase interface process, it is important to control the reaction so that high yields of raw materials and good phase separation are achieved. High raw material yields are advantageous not only from an economical but also from an ecological point of view. Good phase separation is a precondition for obtaining high product qualities.

Thus DOS 2,305,144 describes a process for the continuous preparation of polycarbonates in which the aqueous diphenol solution is brought together with phosgene in a mixing zone in the presence of amines and phosgenation proceeds in a first part of a reaction path. Only then is the solvent added to complete the reaction in the second part of the reactor. One disadvantage is the large excess of phosgene and the large quantity of aqueous reaction phase which constitutes effluent and must be worked up. The large quantity of aqueous reaction phase promotes the phosgene side reactions.

According to DOS 2,353,939, the properties of a polycarbonate prepared by the diphasic interface process are improved by controlling the reaction by regulating the pH. The excess of the phosgene used is a disadvantage and the process is not continuous.

According to the teaching of EP 0,282,546, condensates containing chloroformyl end groups are obtained with a high phosgene yield by the phase interface process if a stable diphenol/water/sodium hydroxide suspension and phosgene are continuously introduced simultaneously into an organic phase contained in the reaction vessel and the reaction product is subsequently isolated. The pH is adjusted to values of from 2 to 5 during the reaction.

The disadvantage in this case lies in the technical difficulties of dosing the suspension and the low pH which considerably increases the time required for phosgenation. Measures for polycondensation are not described.

According to EP 0,434,888, polycarbonates with improved stability in the heat and improved colors are obtained if the process is carried out in water-in-oil emulsions with a specified size of drops.

EP 0,263,432 discloses that condensates containing chloroformyl end groups or polycarbonates may be prepared from aqueous diphenolate solutions and organic phosgene solutions by mixing the phases at pH values of from 8 to 11 and temperatures from 15° to 50° C. and with a phosgene excess of at least 10 mol-% and proceeding with the phosgenation while alkali metal or alkaline earth liquors are added. Preferred phase ratios are from 0.4:1 to 1:1 of water:oil, which are maintained by the subsequent addition of water.

DOS 2,725,967 teaches that it is advantageous for the phosgene yield of a continuous process first to bring the aqueous alkali metal diphenol solution together with the organic phosgene solution in a tube and then to introduce these components into a tank type reactor. The residence time in this tube should be from 0.5 to 15 seconds. This process has the disadvantage that phosgenation takes place at unfavorable phase ratios (oil to water=0.2 to 1) to ensure that the phases can be separated after completion of the reaction. The water consumption is high.

According to EP 0,306,838 A 2, phosgenation is monitored in situ by means of an automatic chloride detector. Fluctuations in the chemistry of the reaction can be detected and counteracted by this procedure. The technical properties of the polycarbonates are improved. The basic idea of the process is to return unreacted diphenolate into the process. One disadvantage of this method, however, lies in the phosgene side reactions which are also troublesome in this procedure of returning the unreacted diphenolate.

According to EP 0,339,503 A 2, the phosgene side reactions are increased in particular if a high initial concentration of sodium hydroxide solution is present. In the said patent specification, the diphenol/sodium hydroxide/water solution is therefore added to the organic phenol solution in an alkali metal/diphenol ratio of less than 2:1 (sub-equivalence of alkali) and oligomers having molecular weights of from 300 to 3000 g/mol form during the first reaction stage. The phase ratios of water to oil are greater than 1; the consumption of water is therefore high. Moreover, the phosgene side reactions are still very unfavorable.

According to EP 0,304,691 A 2, a fine emulsion obtained by powerful mixing is advantageous for the progress of the reaction in a diphasic interface process, admittedly with a very high phosgene excess (20 to 100 mol-%). The large amount of phosgene put into the reaction ensures good phase separation in spite of intensive mixing of the emulsion at the beginning of the reaction. The phosgene yield, however, is rather unsatisfactory.

According to U.S. Pat. Nos. 4,847,352, 5,037,941 and 5,037,942, the reactants are mixed in static mixers to form fine aqueous dispersions which subsequently lead to the formation of coarse dispersions. These steps of dispersion and reaction are repeated until the reaction has been completed.

The continuous production of polycarbonate by the phase interface process often requires a large excess of phosgene and/or unfavorable phase ratios, frequently with a high input of water because problems of separation and washing otherwise occur after the reaction has been completed.

The effect of a satisfactory phase separation is achieved by using large quantities of water in the reaction. This, however, is at the expense of the yields of raw materials and hence also at the expense of the product quality and the reproducibility of the properties of the product.

It has now, surprisingly, been found that production of polycarbonates by the phase interface process proceeds very economically, with high yields of raw materials, great constancy and reproducibility of the molecular weight and excellent separation of the reaction emulsion if the process is carried out throughout with oil-in-water emulsions which have high electrolyte contents in the aqueous phase.

The process, according to the invention, is characterized in that the aqueous reaction phase obtained after the reaction has been completed is in part returned to the phosgenating reactor in such a quantity together with the raw materials that an oil-in-water emulsion is formed directly and maintained over the whole reaction time. It was surprisingly found that the side reactions discussed in the literature are not promoted by large quantities of aqueous phase if high electrolyte contents are present. On the contrary, the quantity of raw material may be reduced.

The "high electrolyte content" refers to the content of electrolytes in the aqueous phase which in accordance with the invention amounts to 50 to 100 percent relative to the total saturation. This high electrolyte content is a necessary consequence of the inventive process which entails returning a portion of the aqueous reaction phase to the phosgenating reactor.

The reaction conditions in the process of the invention favor the formation of an "oil-in-water" emulsion. This emulsion forms where the aqueous phase is present in excess (in terms of volume) over the organic solvent. A characteristic of the present invention is that oil-in-water emulsion is present from the very beginning of the polycarbonate production, that is, from the beginning of the phosgenation reaction. Normally, the formation of such oil-in-water emulsion at the phosgenation stage is not conducive for polycarbonate production, in part because of undesirable side reactions. It was, therefore, surprising and unexpected that where, as in the present invention, the aqueous phase has a high electrolyte content, the formation of oil-in-water is beneficial to the process.

The process according to the invention surprisingly results in permanently reproducible phase separation after the completed reaction, with small residual water contents in the organic phase. Advantages are also found in the washing of the crude polycarbonate solutions to free them from electrolytes. Reactions with additives during the extrusion process are suppressed. Further, the molecular weights obtained in a continuous process can be kept within narrow limits. It is also advantageous to use aqueous alkali metal salt solutions of diphenols at high concentrations in order to reduce the quantity of effluent. It is another advantage that the excess of phosgene can be substantially reduced without any loss of quality of the polycarbonate and/or increase in the diphenol and phenol contents in the aqueous reaction phase. The specific quantity of salt in the effluent and the amount of di- and monophenols in the effluent are reduced.

Diphenols which may be used for the preparation of high molecular weight polycarbonates by the process according to the invention are those which form water-soluble alkali metal salts with alkali metal hydroxides such as sodium or potassium hydroxide. Alkaline earth liquors may also be used. This condition applies to virtually all known diphenols and mixtures thereof.

Diphenols corresponding to the general formula HO—Z—OH in which Z denotes one or more aromatic nuclei which may carry differing substituents are preferred. The substituents may be aliphatic or cycloaliphatic groups or water, chlorine or bromine. Bridging members which may contain aliphatic or cycloaliphatic groups or hetero atoms may be present between two aromatic nuclei. The following are examples: hydroquinone, resorcinol, dihydroxydiphenols, bis-(hydroxyphenyl)alkanes, bis-(hydroxyphenyl)-cycloalkanes, bis-(hydroxyphenyl)-sulphide, bis-(hydroxyphenyl)-ethers, bis-(hydroxyphenyl)-ketone, bis-(hydroxyphenyl)-sulphones, bis-(hydroxyphenyl)-sulphoxides, 1,1'-bis-(hydroxyphenyl)-diisopropylbenzenes and derivatives thereof which are alkylated or halogenated in the nuclei.

These and other suitable diphenols are described, for example, in U.S. Pat. Nos. 4,982,014, 3,028,365, 2,999,835, 3,148,172, 3 275,601, 2,991,273, 3,271,367, 3,062,781, 2,970,131 and 2,999,846, in DOS 15 70 703, 20 63 050, 20 63 052 and 22 11 956 and in French Patent Specification 1,561,518.

Preferred diphenols are in particular 2,2-bis-(4 hydroxyphenyl)propane, 2,2-bis-(3,5-dimethyl-4-hydroxyphenyl)-propane, 1,1-bis-(4 -hydroxyphenyl)-cyclohexane and 1,1-bis-(4-hydroxyphenyl)-3,3,5-trimethyl cyclohexane.

The quantities and types of chain terminators and optionally branching agents may be added to the diphenols before during or after phosgenation but before they are catalyzed to high molecular weight polycarbonates. Suitable chain terminators include the known monophenols such as phenol itself, $C_1C_{10}$-alkylphenols such as p-tert.-butylphenyl and p-cresol and halogenated phenols such as p-chlorophenyl an 2,4,6-tribromophenol. Phenol, cumylphenol, isooctylphenol and p-tert.-butylphenol are preferred chain terminators.

The branching agents used are those having three or four or more than four functional groups, in particular, those having three or more than three phenolic hydroxyl groups; the quantities of these compounds should be kept within the limits of from 0.05 to 2 mol-% conventionally observed for branching agents, these percentages being based on the quantities of diphenols incorporated.

The following are some examples of suitable branching agents having three or more than three phenolic hydroxyl groups: 2,4-bis-(4 -hydroxyphenylisopropyl)-phenol, 2,6-bis-(2'-hydroxy-5'-methyl-benzyl)-4-methylphenol, 2-(4-hydroxyphenyl)-2-(2,4-dihydroxyphenyl)-propane, 1,1,1-tris-(4-hydroxyphenyl)-ethane and 1,4-bis-(4,4'-dihydroxytriphenylmethyl)-benzene. Further examples of trifunctional compounds are: 2,4 -dihydroxybenzoic acid, trimesic acid, cyanuric chloride, 3,3-bis-(4 -hydroxyphenyl)-2-oxo-2,3-dihydroindole and 3,3-bis-(4-hydroxy-3 -methylphenyl)-2-oxo-2,3-dihydroindole.

The solvents used may be any which dissolve oligo and polycarbonates at the chosen reaction temperatures and pressures and are substantially immiscible with water (in the sense of solutions). Chlorinated hydrocarbons such as ethylene chloride or chlorobenzene are preferably used.

These solvents may be used alone or in mixtures of various compositions. When chlorobenzene is used alone it is necessary to employ higher operating temperatures for the reaction and for washing in order to obtain technically useful concentrations of polycarbonate in chlorobenzene. Benzene homologues may also be used as solvents.

A preferred solvent combination for the technically important polycarbonate based on 2,2-bis-(4-hydroxyphenyl)-propane is a mixture of methylene chloride and toluene, which may be used for all stages of the process. The concentration of polycarbonate in solutions containing the said solvent is from 5 to 30%.

Among the many polycondensation catalysts described for the phase interface process, trialkylamines, N-ethylpyrrolidone, N-ethylpiperidine, N-ethylmorpholine, N-isopropylpiperidine and N-isopropylmorpholine are particularly distinguished. Triethylamine and N-ethylpiperidine are particularly suitable.

Reaction loops with heat exchangers, heat controllable stirrer vessels and various types of heat controllable flow tubes are suitable reactors. Common to all the reactors is that they ensure intensive mixing at all times and throughout the apparatus. Suitable flow tubes are also those which are constructed for providing the necessary residence times in residence zones and mixing zones. Flow tubes of this kind have been described in principle in DE-PS 19 20 302 and U.S. Pat. No. 3,674,740. Various types of static mixers available on the market may also be used for maintaining the emulsion. The preferred combination of three reactors in series as used in the process of the present invention comprises a pump circulation reactor and two residence reactors arranged in series, each having mixing and residence zones (as described in DE-PS 19 20 302).

Two pump circulation reactors arranged in series followed by a flow tube have also proved satisfactory.

The pH values are from 8 to 14 in all the stages of the reaction, preferably from 10 to 13.5. These values are obtained by introducing part of the total quantity of sodium hydroxide required into the pump circulation reactor and adding the remainder before entry into the second or third reactor.

The average residence times depend on the types of reactor used. Only short residence times are generally required in flow tubes. The residence times are generally from a few seconds to 30 minutes. Short residence times are an advantage for the first reaction stage; these range from 10 seconds to 30 minutes, preferably from 10 seconds to 15 minutes. Residence times of from 1 minute to 30 minutes, preferably from 2 to 15 minutes, are chosen for the second reaction stage, and residence times of from 2 minutes to 30 minutes, preferably from 2 minutes to 15 minutes for the third reaction stage. The residence times also depend very much on the intensity of mixing, in the particular reactors used and on the diphenols put into the process.

In one embodiment given by way of example, the process according to the invention is carried out in the following three steps which are characterized in that the aqueous alkali metal salt solution of the diphenols is reacted with phosgene in the first step in the presence of organic solvents, the returned aqueous reaction phase and an additional dose of alkali metal liquor which is added with some time delay and the intermediate product obtained continues to be reacted in the second step with the addition of monophenols and a further quantity of sodium hydroxide solution and the intermediate product obtained from this second step is condensed in the third step to produce the polycarbonate in the presence of a polycondensation catalyst.

It is advantageous for the process according to the invention if the concentration of diphenols in the aqueous alkali metal solution is from 10 to 40% by weight, preferably from 15 to 30% by weight, based on the aqueous alkali metal salt solution.

It is also advantageous for the process according to the invention if the aqueous reaction phase is returned in such a quantity that the concentration of diphenols, based on the whole reaction phase consisting of alkali metal salt solution of the diphenols, alkali liquor and returned aqueous reaction phase, amounts to 2.5 to 25% by weight preferably 2.5 to 15% by weight, most preferably 2.5 to 10% by weight.

In the process according to the invention, the reaction may advantageously be controlled so that the aqueous reaction phase is returned in such a quantity and precooled to such an extent that even without further cooling the boiling point of the solvent or of the lowest boiling solvent in the case of a solvent mixture is not reached at normal pressure in the reactors.

In a preferred method of carrying out the reaction, the solvents or solvent mixtures are chosen to have higher boiling points than the temperature which becomes established in the reaction mixture without precooling of the returned aqueous reaction phase, so that cooling can generally be omitted.

A preferred embodiment of the process is described below. The alkaline aqueous diphenol solution, the returned aqueous reaction phase (always in a quantity which ensures an oil-in-water emulsion throughout), the phosgene with solvent and the sodium hydroxide solution which is added with time delay to maintain the pH from 8 to 14 are introduced into the emulsion which is circulated by pump in a reaction coil. After leaving the reactor, a further quantity of sodium hydroxide solution is added to the reaction emulsion to maintain the pH and the necessary chain terminator is also pumped in. The reaction emulsion thus containing the added components is introduced into another reaction coil. After the reaction emulsion has left this reactor, the polycondensation catalyst is added and the emulsion is pumped through a flow tube to form high molecular weight polycarbonate. The emulsion is then separated into its phases in a simple separating vessel. Part of the aqueous reaction phase is returned to the first reaction stage and the remainder is removed for working up of the effluent. The organic phase is washed free from electrolyte by known methods. The polycarbonate is isolated by evaporation of the solvents, also by known methods.

The thermoplastic, aromatic polycarbonates obtained by the process according to the invention may have weight average molecular weights Mw (e.g. determined by measuring the relative solution viscosity in $CH_2Cl_2$ at 25° C. and at a concentration of 0.5 g in 100 ml of $CH_2Cl_2$ after calibration) of from 10,000 to 100,000.

They may be worked up in the usual apparatus to produce any moldings and articles such as films, threads, plates, lamp housings, optical lenses and compact discs.

The usual additives such as stabilizers, mold release agents, flame retardants, antistatic agents, fillers, fibres, impact strength modifiers, etc. may be added in the usual quantities for thermoplastic polycarbonates during the process of isolating the polycarbonates obtained according to the invention or before or while they are processed.

The thermoplastic polycarbonates obtainable according to the invention are used technically in the usual fields for polycarbonates, for example in the electrical field or the building industry, for lighting purposes and optical purposes but especially in the field of optical discs and audio discs.

The invention is further illustrated but is not intended to be limited by the following examples in which all parts and percentages are by weight unless otherwise specified.

EXAMPLES

EXAMPLE 1

88.4 kg of bisphenolate solution/h, 85.2 kg of a solvent mixture of 50 parts by weight of methylene chloride and 50 parts by weight of chlorobenzene/h, 6.4 kg of phosgene/h, 177 kg of aqueous reaction phase/h and 2.15 kg of 50% sodium hydroxide solution/h are pumped into a pump circulation reactor with heat exchanger. The bisphenolate solution contains 15% by weight of bisphenol A and 2 mol of sodium hydroxide per mol of bisphenol A. The BPA concentration, based on the quantity of aqueous phases introduced, is 5% by weight of bisphenol A.

The temperature is maintained at 28° C. by cooling and the average residence time is 6.9 minutes.

Before entering the first heat controllable residence reactor consisting of mixing and residence time zones, 3.92 kg of a 5% phenol solution in a solvent mixture of 50 parts by weight of methylene chloride and 50 parts by weight of chlorobenzene/h and 0.91 kg of 50% sodium hydroxide solution/h are added to the reaction emulsion.

The temperature is adjusted to 31° C. The average residence time is 3.0 minutes.

The reaction emulsion is then pumped through another residence reactor of similar construction with the addition of 3.3 kg of a 2% by weight N-ethylpiperidine solution in a solvent mixture of 50 parts by weight of methylene chloride and 50 parts by weight of chlorobenzene/h. The temperature is adjusted to 36° C. The average residence time is 3.0 minutes.

The emulsion is observed to undergo spontaneous phase separation after leaving the reactor. The separating time of a sample in a 1 liter measuring beaker is about 1 minute. The residual water content of the crude polycarbonate solution is 0.27%.

0.23% $OH^-$, 0.41% $CO_3^-$, 45 ppm phenol and <10 ppm bisphenol A are found in the aqueous reaction phase. The pH is found to be 13.2.

The crude polycarbonate solution is freed from catalyst by extraction with acid in known manner and washed free from electrolyte with water.

The polycarbonate is isolated by evaporation of the solvent in an extruder. In the extruder, coloring agents are added to the polycarbonate to compensate for the "yellow tinge" and Tinuvin 350 (Ciba Geigy) is incorporated as UV stabilizer.

The following data are determined on the polycarbonate: rel. viscosity 1.267, 2 ppm saponifiable chlorine, 90 ppm phenolic OH end groups, 0.5 ppm sodium, permeability to light 89.4%, 0.31% free Tinuvin 350 and 0.30% total Tinuvin 350 content (determined by UV spectroscopy). No incorporation of Tinuvin has occurred within the degree of accuracy of measurement.

EXAMPLE 2

The same arrangement of reactors is used as in Example 1. The following streams of raw material are introduced:

66.3 kg of bisphenolate solution/h, 85.2 kg of a solvent mixture of 50 parts by weight of methylene chloride and 50 parts by weight of chlorobenzene/h, 6.4 kg of phosgene/h, 199 kg of aqueous reaction phase/h and 1.94 kg of 50% sodium of hydroxide solution/h. The bisphenolate solution contains 20% by weight of bisphenol A and 2 mol of sodium hydroxide per mol of bisphenol A. Based on the aqueous phases introduced, the BPA concentration is 5% by weight of bisphenol A.

The temperature is maintained at 28° C. by cooling and the average residence time is 6.9 minutes.

Before the reaction emulsion enters the first residence reactor, 3.92 kg of a 5% phenol solution in a solvent mixture of 50 parts by weight of methylene chloride and 50 parts by weight of chlorobenzene/h and 0.83 kg of 50% sodium hydroxide solution/h are added to the emulsion.

The temperature is adjusted to 31° C. The average residence time is 3.0 minutes.

The reaction emulsion is passed through another residence reactor with the addition of 3.3 kg of a 2% by weight solution of N-ethylpiperidine in a solvent mixture of 50 parts by weight of methylene chloride and 50 parts by weight of chlorobenzene/h. The temperature is adjusted to 36° C. The average residence time is 3.0 minutes.

The emulsion is observed to undergo spontaneous phase separation after leaving the reactor. The separating time of a sample in a 1 liter measuring beaker is about 1 minute. The residual water content of the crude polycarbonate solution is 0.25%.

0.26% $OH^-$, 0.58% $CO_3^-$, 10 ppm phenol and <10 ppm bisphenol A are found in the aqueous reaction phase. The pH is found to be 13.3.

The phases are worked up as described in Example 1.

The following data are determined on the polycarbonate: rel. viscosity 1.267, <2 ppm saponifiable chlorine, 70 ppm phenolic OH end groups, <0.5 ppm sodium, permeability to light 89.4%, 0.30% free Tinuvin 350 and 0.31% total Tinuvin 350 content. No incorporation of Tinuvin has taken place within the degree of accuracy of measurement.

EXAMPLE 3

The same arrangement of reactors and the same quantities of raw material are used as in Example 1 except that a solvent mixture of 70 parts by weight of methylene chloride and 30 parts by weight of toluene is used instead of the solvent mixture of 50 parts by weight of methylene chloride and 50 parts by weight of chlorobenzene.

The temperatures and average residence times in the reactors are virtually the same as in Example 1.

The residual water content in the crude polycarbonate solution is 0.19% after phase separation. The separating time of a sample in a 1 liter measuring beaker is about 1 minute.

0.23% $OH^-$, 0.41% $CO_3^-$, 55 ppm phenol and <10 ppm bisphenol A are found in the aqueous reaction phase. The pH is 13.2. Working up after the spontaneous phase separation is carried out as in Example 1.

The following data are determined on the polycarbonate: rel. viscosity 1.264, <2 ppm saponifiable chlorine, 85 ppm phenolic OH end groups, <0.5 ppm sodium, permeability to light 89.7%, 0.30% free Tinuvin 350 and 0.30% total Tinuvin 350 content. No incorporation of Tinuvin has taken place.

EXAMPLE 4

The same arrangement of reactors and the same quantities of raw material are used as in Example 1 except that pure methylene chloride is used instead of the solvent mixture of 50 parts by weight of methylene chloride and 50 parts by weight of chlorobenzene.

The temperatures are virtually the same. The average residence time in the pump circulation reactor is 7.0 minutes and in the residence reactors 3.1 minutes each.

0.31% of residual water are found in the crude polycarbonate solution after the spontaneous phase separation. The separating time of a sample in a 1 liter measuring beaker is about 1 minute.

0.25% $OH^-$, 0.44% $CO_3^-$, 45 ppm phenol and <10 ppm bisphenol A are found in the aqueous reaction phase. The pH is found to be 13.4.

The polycarbonate was isolated in an extruder by replacement of the methylene chloride by toluene followed by evaporation of the toluene in evaporation apparatus as described in DE-PS 19 20 302.

The following data were determined on the polycarbonate: rel. viscosity 1.270, <2 ppm saponifiable chlorine, 50 ppm phenolic OH end groups, <0.5 ppm sodium, permeability to light 89.2%, 0.29% free Tinuvin 350 and 0.29% total Tinuvin 350 content. No incorporation of Tinuvin has taken place.

EXAMPLE 5

The same arrangement of reactors and the same quantities of raw material are used as in Example 1 except that pure chlorobenzene is used instead of the solvent mixture of 50 parts by weight of methylene chloride and 50 parts by weight of chlorobenzene. The volume of the pump circulation reactor is reduced to obtain a shorter residence time. The reaction enthalpy is not removed so that the elevated temperatures necessary for dissolving the polycarbonates formed may be obtained.

The temperature in the pump circulation reactor is 69° C. and the average residence time is 2.7 minutes. The temperature in the first residence reactor is 75° C. and in the second it is 84° C., and the average residence time is 2.9 minutes in each reactor.

0.17% of residual water is found in the crude polycarbonate solution after the spontaneous phase separation.

The separating time of a sample in a 1 liter measuring beaker is about 1 minute.

0.24% $OH^-$, 0.41% $CO_3^{--}$, 40 ppm phenol and <10 ppm bisphenol A are found in the aqueous reaction phase. The pH is 13.2.

The polycarbonate is isolated as in Example 1.

The following data are determined on the polycarbonate: rel. viscosity 1.263, <2 ppm saponifiable chlorine, 115 ppm phenolic OH end groups, <0.5 ppm sodium, permeability to light 89.9%, 0.32% free Tinuvin 350 and 0.31% total Tinuvin 350 content. No incorporation of Tinuvin has taken place within the degree of accuracy of measurement.

Comparison Example 1

The same arrangement of reactors and the same quantities of raw material are used as in Example 1 except that no aqueous reaction phase is returned.

The temperature in the pump circulation reactor was 28° C. and the average residence time was 13.3 minutes. Data for the first residence reactor: 31° C. and 5.8 minutes; for the second reactor: 36° C. and 5.7 minutes.

The residual water content after phase separation is 9.4% in the crude polycarbonate solution. There is virtually no reduction in this value even after the sample has been left to stand for 8 hours. The separating time of a sample in a 1 liter measuring beaker is 13 minutes.

0.21% $OH^-$, 0.48% $CO_3^{--}$, 345 ppm phenol and 770 ppm bisphenol A are found in the aqueous reaction phase. The pH is 13.0.

The polycarbonate is isolated as in Example 1.

The following data are determined on the polycarbonate: rel. viscosity 1.224, <2 ppm saponifiable chlorine, 830 ppm phenolic OH end groups, 3.4 ppm sodium. No additives are introduced, in view of the poor analytical data.

Comparison Example 2

This Example is similar to Comparison Example 1 but the quantity of phosgene is increased to 7.0 kg/h. The quantity of sodium hydroxide solution for the pump circulation reactor is 3.47 kg/h and the corresponding quantity for the first residence reactor is 1.49 kg/h.

Temperatures and average residence times are the same as in Comparison Example 1.1.

The residual water content after phase separation is 2.9% in the crude polycarbonate solution. There is virtually no reduction in this value even after the sample has been left to stand for 8 hours. The separating time of a sample in a 1 liter measure beaker is 8 minutes.

0.20% $OH^-$, 0.87% $CO_3^{--}$, 245 ppm phenol and 230 ppm bisphenol A are found in the aqueous reaction phase. The pH is 13.2.

The polycarbonate is isolated as in Example 1.

The following data are determined on the polycarbonate: rel. viscosity 1.273, <2 ppm saponifiable chlorine, 190 ppm phenolic OH end groups, 1.1 ppm sodium, permeability to light 88.5%, 0.16% free Tinuvin 350 and 0.32% total Tinuvin 350 content. Tinuvin is partly incorporated (0.16%).

Comparison Example 3

The same arrangement of reactors is used as in Example 1. The following streams of raw material are introduced:

88.4 kg bisphenolate solution/h, 85.2 kg of a solvent mixture of 50 parts by weight of methylene chloride and 50 parts by weight of chlorobenzene/h, 6.4 kg phosgene/h, 177 kg water/h and 3.60 kg 50% sodium hydroxide solution/h. The bisphenolate solution contains 15% by weight of bisphenol A and 2 mol of sodium hydroxide per mol of bisphenol A.

The temperature is maintained at 28° C. by cooling and the average residence time is 6.6 minutes.

3.92 kg of a 5% phenol solution in a solvent mixture of 50 parts by weight of methylene chloride and 50 parts by weight of chlorobenzene/h and 1.54 kg of a 50% sodium hydroxide solution/h are added to the reaction emulsion before it enters the first residence reactor. The temperature is 31° C. and the average residence time is 2.9 minutes.

The reaction emulsion is then pumped through another residence reactor of similar construction with the addition of 3.3 kg of a 2% by weight N-ethylpiperidine solution in a solvent mixture of 50 parts by weight of methylene chloride and 50 parts by weight of chlorobenzene/h. The temperature is 36° C. and the average residence time is 2.9 minutes.

The residual water content in the crude polycarbonate solution is 5.3% after phase separation. There is virtually no reduction in this value even after the sample has been left to stand for 8 hours. The separating time of the sample in a 1 liter measuring beaker is 5 minutes.

0.20% $OH^-$, 0.16% $CO_3^{--}$, 295 ppm phenol and 630 ppm bisphenol A are found in the aqueous reaction phase. A pH of 13.0 is measured.

The following data are determined on the polycarbonate: relative viscosity 1.312, <2 ppm saponifiable chlorine, 610 ppm phenolic OH end groups, 0.5 ppm sodium. Additives are not introduced, on account of the end groups.

Comparison Example 4

The same arrangement of reactors is used as in Example 1. The following streams of raw material are introduced:

88.4 kg bisphenolate solution/h, 85.2 kg of a solvent mixture of 50 parts by weight of methylene chloride and 50 parts by weight of chlorobenzene/h, 7.0 kg of phosgene/h, 177 kg water/h and 4.94 kg of 50% sodium hydroxide solution/h. The bisphenolate solution contains 15% by weight bisphenol A and 2 mol of sodium hydroxide per mol of bisphenol A.

The temperature is maintained at 28° C. by cooling and the average residence time is 6.6 minutes.

3.92 kg of a 5% phenol solution in a solvent mixture of 50 parts by weight of methylene chloride and 50 parts by weight of chlorobenzene/h and 2.12 kg of 50% sodium hydroxide solution/h are added to the reaction emulsion before it enters the first residence reactor. The temperature is 31° C. and the average residence time is 2.9 minutes.

The reaction emulsion is then pumped through another residence reactor of similar construction with the addition of 3.3 kg of a 2% by weight N-ethylpiperidine solution in a solvent mixture of 50 parts by weight of methylene chloride and 50 parts by weight of chlorobenzene/h. The temperature is 36° C. and the average residence time is 2.9 minutes.

The residual water content in the crude polycarbonate solution is 0.22% after phase separation. The separating time of a sample in a 1 liter measuring beaker is about 1 minute.

0.22% $OH^-$, 0.29% $CO_3^{--}$, 260 ppm phenol and 370 ppm bisphenol A are found in the aqueous reaction phase. The pH is found to be 13.3.

The following data are determined on the polycarbonate: relative viscosity 1.347, <2 ppm saponifiable chlorine, 285 ppm phenolic OH end groups, <0.5 ppm sodium, permeability to light 89.3%, 0.30% free Tinuvin 350 and 0.31% total Tinuvin 350 content. No incorporation of Tinuvin has taken place within the degree of accuracy of measurement.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the continuous phase interfacial polycondensation process for the preparation of thermoplastic aromatic polycarbonate from raw materials which include phosgene, diphenols, chain terminators and optionally branching agents by the phosgenation of an aqueous alkali metal salt solution of the diphenols in the presence of solvents or solvent mixtures which dissolve aromatic oligocarbonates and aromatic polycarbonates and are themselves immiscible with water, at pH values of from 8 to 14, using polycondensation catalysts and three reactors arranged in series, the improvement comprising returning a proportion of the aqueous reaction phase obtained after the completed reaction to the phosgenation reactor in such a quantity together with the raw materials that an oil-in-water emulsion is produced directly and is maintained in the three reactors throughout the reaction time.

2. In the process of claim 1 comprising;
   a) reacting the aqueous alkali metal solution of the diphenols with phosgene in the first reactor with the addition of monophenols in the presence of organic solvents,
   b) introducing the returned aqueous reaction phase and additional alkali metal liquor with time delay,
   c) continuing the intermediate product obtained to be reacted in the second reactor, optionally with the addition of monophenols and a further quantity of sodium hydroxide solution, and
   d) condensing this later intermediate product in the presence of a polycondensation catalyst.

3. The process of claim 1 comprising the concentration of the diphenols in the aqueous alkali metal salt solution being from 10% by weight to 40% by weight, based on the aqueous alkali metal salt solution.

4. The process of claim 1, comprising returning the aqueous reaction phase in such a quantity that the concentration of the diphenols, based on the total aqueous phase is from 2.5% by weight to 25% by weight.

5. The process of claim 1, comprising returning the aqueous reaction phase in such a quantity that the concentration of the diphenols based on the total aqueous phase is from 2.5% by weight to 15% by weight.

6. A process according to claim 1, characterized in that the aqueous reaction phase to be returned is returned in such a quantity and cooled to such an extent that even without further cooling the boiling point of the solvent used or of the lowest boiling solvent in the solvent mixture used is not reached at normal pressure in the three reactors.

7. Process according to claim 1, characterized in that the solvents or solvent mixtures used have boiling points higher than the temperature which becomes established in the reaction mixture without pre-cooling of the returned aqueous reaction phase, whereby cooling may generally be omitted.

8. Process according to claim 1, characterized in that the residence time is from 10 seconds to 30 minutes for the first reaction stage, from 1 minute to 30 minutes for the second reaction stage and from 2 minutes to 30 minutes for the third reaction stage.

9. Process according to claim 1, characterized in that either the reactors for the three reaction stages are flow tubes or a pump circulation reactor is used as reactor for the first reaction stage and two flow tubes are used for the two other reaction stages or two pump circulation reactors are used for the first two reaction stages and a flow tube is used for the third reaction stage.

* * * * *